(12) United States Patent
Vivier et al.

(10) Patent No.: US 10,030,686 B2
(45) Date of Patent: Jul. 24, 2018

(54) ANCHOR FOR FIXING IN A WALL

(71) Applicant: SAINT-GOBAIN PLACO, Suresnes (FR)

(72) Inventors: Guillaume Vivier, Bagneux (FR); Hugues Obame Obame, Nogent sur Oise (FR)

(73) Assignee: SAINT-GOBAIN PLACO, Suresnes (FR)

( * ) Notice: Subject to any disclaimer, the term of this patent is extended or adjusted under 35 U.S.C. 154(b) by 167 days.

(21) Appl. No.: 14/411,155

(22) PCT Filed: Jun. 26, 2013

(86) PCT No.: PCT/FR2013/051495
§ 371 (c)(1),
(2) Date: Dec. 24, 2014

(87) PCT Pub. No.: WO2014/001720
PCT Pub. Date: Jan. 3, 2014

(65) Prior Publication Data
US 2015/0192163 A1 Jul. 9, 2015

(30) Foreign Application Priority Data

Jun. 28, 2012 (FR) ..................................... 12 56151

(51) Int. Cl.
*F16B 13/06* (2006.01)
*F16B 29/00* (2006.01)
(Continued)

(52) U.S. Cl.
CPC ........ *F16B 29/00* (2013.01); *B29C 45/14377* (2013.01); *F16B 13/002* (2013.01);
(Continued)

(58) Field of Classification Search
CPC ...... F16B 31/021; F16B 31/02; F16B 37/067; F16B 19/1072; F16B 13/061; F16B 13/002
(Continued)

(56) References Cited

U.S. PATENT DOCUMENTS 2,913,953 A * 11/1959 Tendler ................. F16B 13/003
29/509
2,918,841 A * 12/1959 Poupitch ............... F16B 13/061
411/36

(Continued)

FOREIGN PATENT DOCUMENTS

| CA | 2080065 A1 | 4/1994 |
|----|------------|--------|
| EP | 0 859 157 A2 | 8/1998 |

(Continued)

OTHER PUBLICATIONS

International Search Report dated Oct. 22, 2013, in PCT/FR2013/051495, filed Jun. 26, 2013.

*Primary Examiner* — Flemming Saether
(74) *Attorney, Agent, or Firm* — Oblon, McClelland, Maier & Neustadt, L.L.P.

(57) ABSTRACT

A self-drilling anchor including a screw and an anchor body configured to receive a shank of the screw, the anchor body including: a flange at an end oriented toward a head of the screw, a threaded portion, a deformable expansion portion between the flange and the threaded portion, and a rotation locking mechanism preventing rotation of the anchor body relative to the wall. The threaded portion is configured to engage with the screw thread and advance in a direction of the flange, by deforming the expansion portion, when the screw is screwed into the threaded portion. The anchor body further includes a piercing element at the opposite end from the flange, the anchor including a fastening mechanism between the screw and the anchor body, the fastening
(Continued)

mechanism being detachable by a torque, applied between the screw and the anchor body, equal to or greater than a predetermined torque.

23 Claims, 9 Drawing Sheets

(51) Int. Cl.
*F16B 13/00* (2006.01)
*B29C 45/14* (2006.01)
*F16B 31/02* (2006.01)
*B29L 1/00* (2006.01)

(52) U.S. Cl.
CPC ......... *F16B 13/061* (2013.01); *B29L 2001/00* (2013.01); *F16B 13/003* (2013.01); *F16B 31/021* (2013.01)

(58) Field of Classification Search
USPC .................................. 411/30, 31, 34, 2, 3, 5
See application file for complete search history.

(56) References Cited

U.S. PATENT DOCUMENTS

| | | | |
|---|---|---|---|
| 3,381,566 A | 5/1968 | Passer | |
| 3,385,156 A | 5/1968 | Polos | |
| 3,942,407 A * | 3/1976 | Mortensen | F16B 37/067 411/36 |
| 6,609,866 B2 * | 8/2003 | Huang | F16B 13/001 411/30 |
| 6,969,220 B2 * | 11/2005 | Anquetin | F16B 13/001 411/38 |
| 7,713,010 B2 * | 5/2010 | Cheng | F16B 13/003 411/29 |
| 9,309,906 B2 * | 4/2016 | Hsu | F16B 5/0642 |
| 2006/0072979 A1 | 4/2006 | McDuff et al. | |
| 2008/0008554 A1 * | 1/2008 | Lu | F16B 13/003 411/29 |
| 2010/0303574 A1 | 12/2010 | McDuff et al. | |

FOREIGN PATENT DOCUMENTS

| | | |
|---|---|---|
| FR | 2 640 704 A1 | 6/1990 |
| WO | 2004/053341 A2 | 6/2004 |

\* cited by examiner

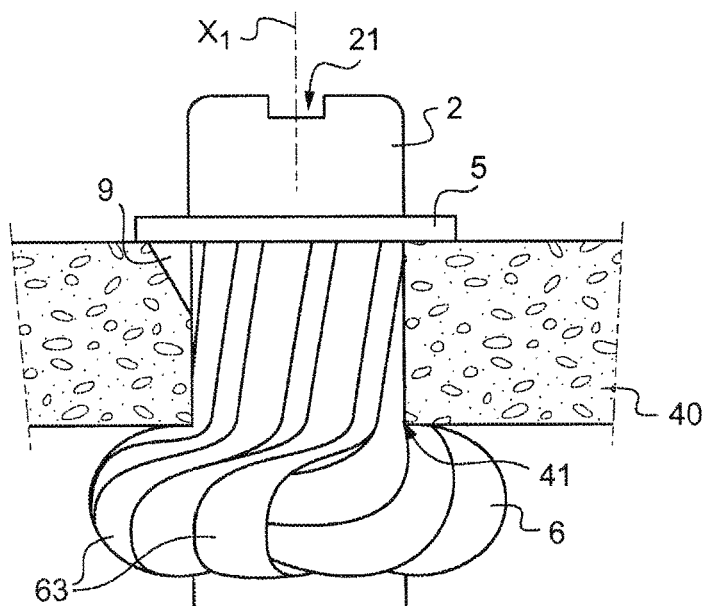
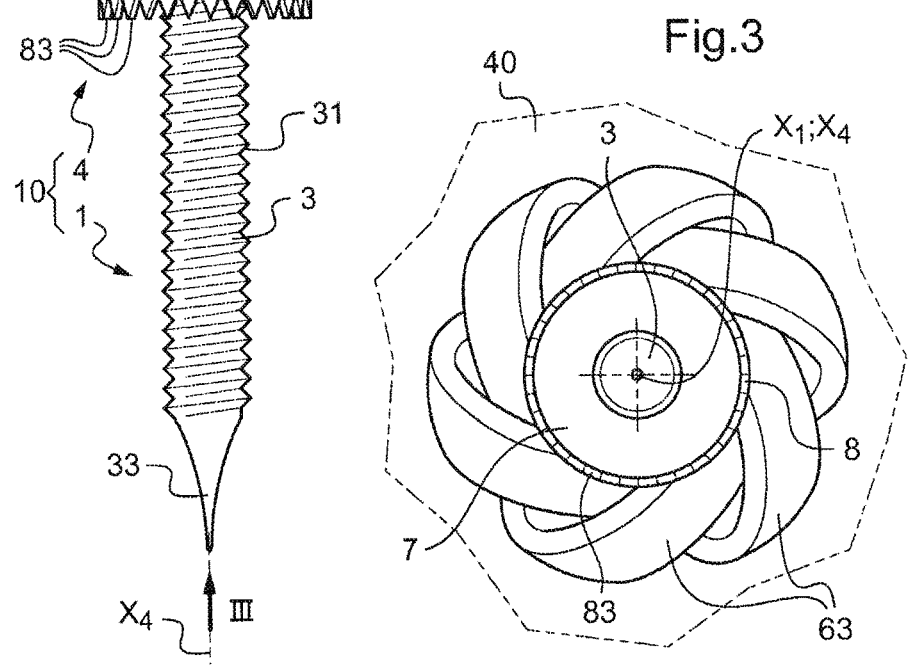
Fig.2
Fig.3

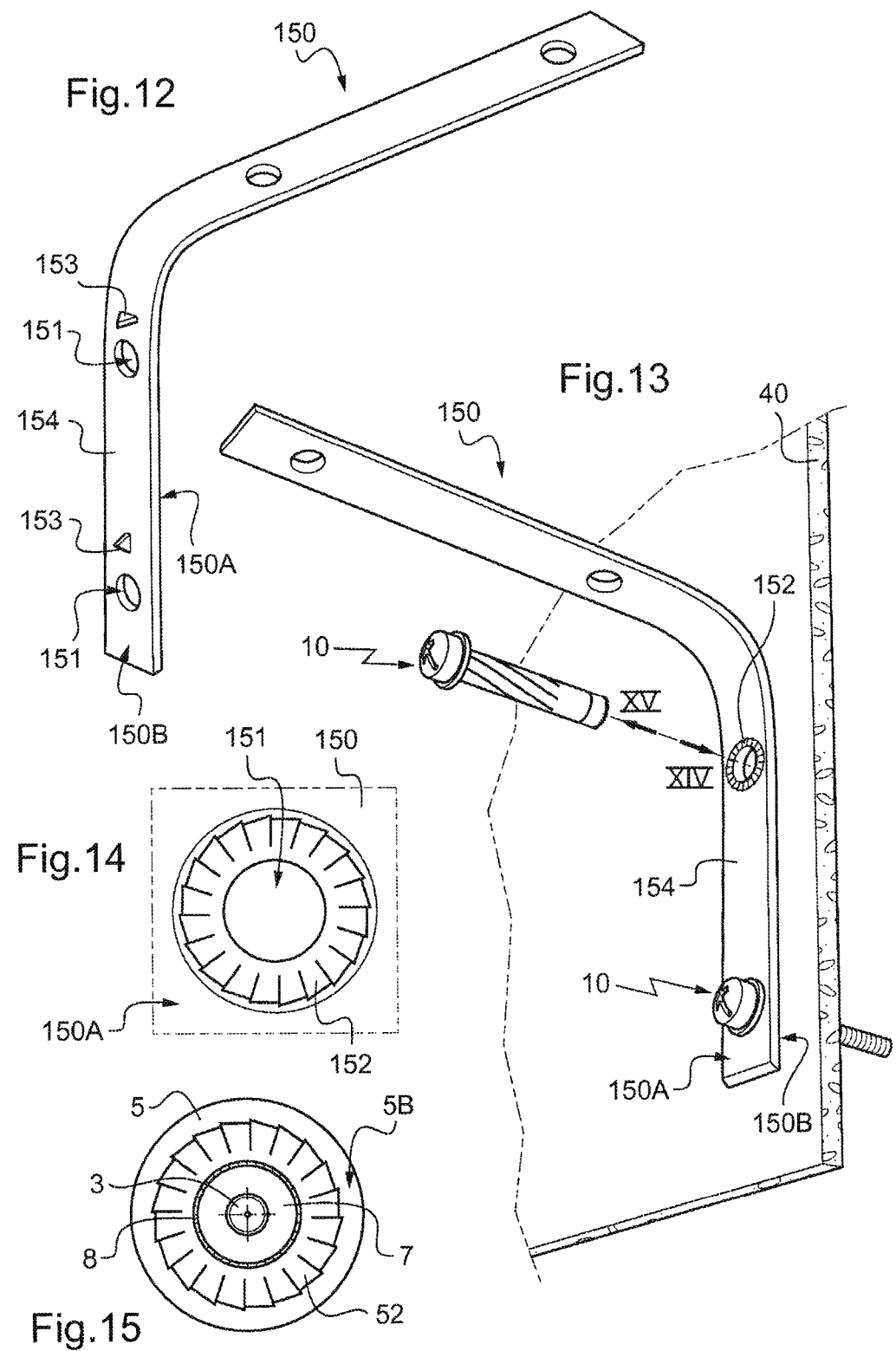

ANCHOR FOR FIXING IN A WALL

The present invention relates to an anchor for fixing in a wall and to a method for manufacturing such an anchor.

It is known to use an expansion anchor bolt to fix a part to a relatively thin wall, such as plasterboard. U.S. Pat. No. 3,316,796 describes a conventional expansion anchor bolt comprising a screw which is received in an anchor body, where the anchor body is provided with a flange at that end of the anchor body oriented toward the head of the screw and, at the opposite end from the head of the screw, a threaded portion which engages with the thread of the screw. In order to fix a part to a wall using such an anchor, several steps are needed. First of all, a hole is made in the wall and the anchor body is inserted therein until the flange comes to press against the wall. The screw is then screwed into the threaded portion which causes the threaded portion to advance toward the head of the screw and causes the anchor body to expand behind the wall. The anchor body is thus immobilized in the wall. The screw is then unscrewed and the part to be fixed is placed against the flange of the anchor body. Finally, the screw is once again inserted into the anchor body through the part, and is screwed there in order to fix the part.

Implementing these successive steps is long and tedious. Moreover, installing the anchor requires several tools, in particular a drilling bit of a suitable size for the anchor body in order to avoid any damage to the wall when the anchor is inserted.

The invention intends more particularly to remedy these drawbacks by proposing a self-drilling anchor which makes it possible to fix a part to a wall simply and quickly, wherein the part can be fixed in a single step and using a conventional screwing tool.

To this end, one subject of the invention is a self-drilling anchor for fixing in a wall, comprising a screw which has a head and a shank bearing a thread, and an anchor body designed to receive the shank of the screw, wherein the anchor body comprises:
- a flange at that end of the anchor body oriented toward the head of the screw,
- a threaded portion designed to engage with the thread of the screw,
- a deformable expansion portion between the flange and the threaded portion,
- rotation locking means for preventing rotation of the anchor body relative to the wall, the threaded portion being designed to advance in the direction of the flange, by deforming the expansion portion, when the screw is screwed into the threaded portion, characterized in that the anchor body further comprises a piercing element at its opposite end from the flange, the anchor comprising fastening means between the screw and the anchor body, wherein these fastening means are detachable for a torque, applied between the screw and the anchor body, equal to or greater than a predetermined torque.

Such a self-drilling anchor makes it possible to fix a part to a wall in a single step, by driving the screw in rotation using a conventional screwing tool, in particular an electric screwdriver. In a first step, as long as the torque applied between the screw and the anchor body remains less than the predetermined torque, the screw and the anchor body are connected to each other in terms of movement by the fastening means. By driving the screw in rotation, the piercing element is caused to rotate and, by bringing the piercing element into contact with the wall, a hole is made in the wall, with the anchor body being inserted therein at the same time. It is thus understood that the fastening torque between the screw and the anchor body must be greater than the torque required to pierce the wall. The anchor body is immobilized in the hole in the wall by the rotation locking means, with its flange pressing against the wall or against a part to be fixed to the wall. The screw and the anchor body remain fastened to one another until a torque equal to or greater than the predetermined torque is reached. As the torque on the screw is increased, the screw detaches from the anchor body, causing the screw to be screwed into the threaded portion of the anchor body and causing the threaded portion to advance in the direction of the flange. The result is a deformation of the expansion portion which locks the anchor body in the hole in the wall.

The piercing element advantageously comprises an internal bore designed for the shank of the screw to pass through freely. The piercing element, which is secured to the threaded portion, can thus advance with the latter in the direction of the flange as the screw is screwed into the threaded portion. As a result, the anchor body takes up less space behind the wall when in the mounted configuration.

The predetermined torque, above which the screw and the anchor body are no longer fastened to one another, is adjusted depending on the mechanical properties of the wall and of the elements making up the anchor body. In particular, the predetermined torque must be greater than the torque needed for piercing the wall and less than the torque above which the rotation locking means of the anchor body are no longer effective.

Within the scope of the invention, the detachable fastening means are active between the screw and the anchor body independently of a contact force between the head of the screw and the flange of the anchor body. In particular, there can be a space between the head of the screw and the flange of the anchor body when piercing the wall. The presence of such fastening means which act independently of a contact force between the head of the screw and the flange of the anchor body is particularly advantageous when the torque to be applied in order to achieve the deformation of the expansion portion is less than the piercing torque. According to an advantageous feature, the detachable fastening means ensure a fastening between the shank of the screw and the anchor body.

According to other advantageous features of an anchor according to the invention, considered in isolation or according to all technically possible combinations:
- the piercing element comprises, at its opposite end from the flange, a plurality of teeth distributed circumferentially around the bore; in particular, the piercing element can be a hole saw;
- the opposite end of the shank of the screw from the head forms a center punch for the piercing element;
- the radial dimensions of the piercing element are equal to or greater than the radial dimensions of the threaded portion and of the expansion portion in the non-deformed state, and are strictly smaller than the radial dimensions of the flange;
- the expansion portion is made of plastic;
- the piercing element is made of metal;
- the threaded portion is made of metal;
- the threaded portion and the piercing element are a single metal part;
- the anchor body is obtained by injection molding a plastic material around the or each metal part formed by the threaded portion and/or the piercing element;
- the expansion portion, the threaded portion and the piercing element are made of plastic;

the threaded portion and the piercing element are made of a plastic material which is more rigid than the plastic material of the expansion portion;

the anchor body is obtained by injection molding in a single part;

the detachable fastening means comprise a layer of adhesive between the screw and the anchor body, which is designed to break when the predetermined torque is exceeded;

the detachable fastening means comprise a frangible connection between the screw and the anchor body, which is designed to break when the predetermined torque is exceeded;

the detachable fastening means comprise a prestress connection between the screw and the anchor body, which is designed to break when the predetermined torque is exceeded;

the rotation locking means for preventing rotation of the anchor body relative to the wall comprise at least one fin for anchoring in the wall near the flange;

the expansion portion comprises a plurality of longitudinal slits which are distributed circumferentially and are inclined relative to a longitudinal axis of the expansion portion, which define a plurality of strips which are helically deformable when the screw is screwed into the threaded portion.

Another subject of the invention is also a method for manufacturing an anchor as described hereinabove, the threaded portion and/or the piercing element of which is made of metal, wherein the or each metal part formed by the threaded portion and/or the piercing element is placed in a mold and a plastic material is injected into the mold around the or each metal part.

Another subject of the invention is also a method for manufacturing an anchor as described hereinabove, the expansion portion, the threaded portion and the piercing element of which are made of plastic, by injecting a plastic material or several compatible plastic materials in a mold.

Another subject of the invention is also the use of an anchor as described hereinabove for fixing in a thin wall, in particular a construction panel, such as a plasterboard, including a fiber reinforced plasterboard or a fiber clad plasterboard, in particular using glass fibers (glass mat); a cement board; a chipboard; a wooden panel; a hollow clay block. Such construction panels can be used in conjunction with an insulating panel, in particular the invention can be implemented for fixing in a composite panel formed, for example, by assembling a plasterboard panel and an expanded polystyrene panel or by assembling a plasterboard panel and a polyurethane foam panel.

A final subject of the invention is the use of an anchor as described hereinabove for fixing in a solid material, in particular cellular concrete.

The features and advantages of the invention will become apparent from the following description of several embodiments of an anchor according to the invention, given solely by way of example and with reference to the appended drawings in which:

FIG. 2 is a view similar to FIG. 1, the anchor being immobilized in the wall;

FIG. 3 is a view in the direction of the arrow III in FIG. 2;

FIG. 12 is a perspective view of a bracket fixed to the wall by means of the anchor shown in FIG. 11;

FIG. 13 is a perspective view of the bracket during the process of fixing it to the wall by means of two anchors as shown in FIG. 11;

FIG. 14 is a view in the direction of the arrow XIV in FIG. 13;

FIG. 15 is a view in the direction of the arrow XV in FIG. 13.

Figure 1:
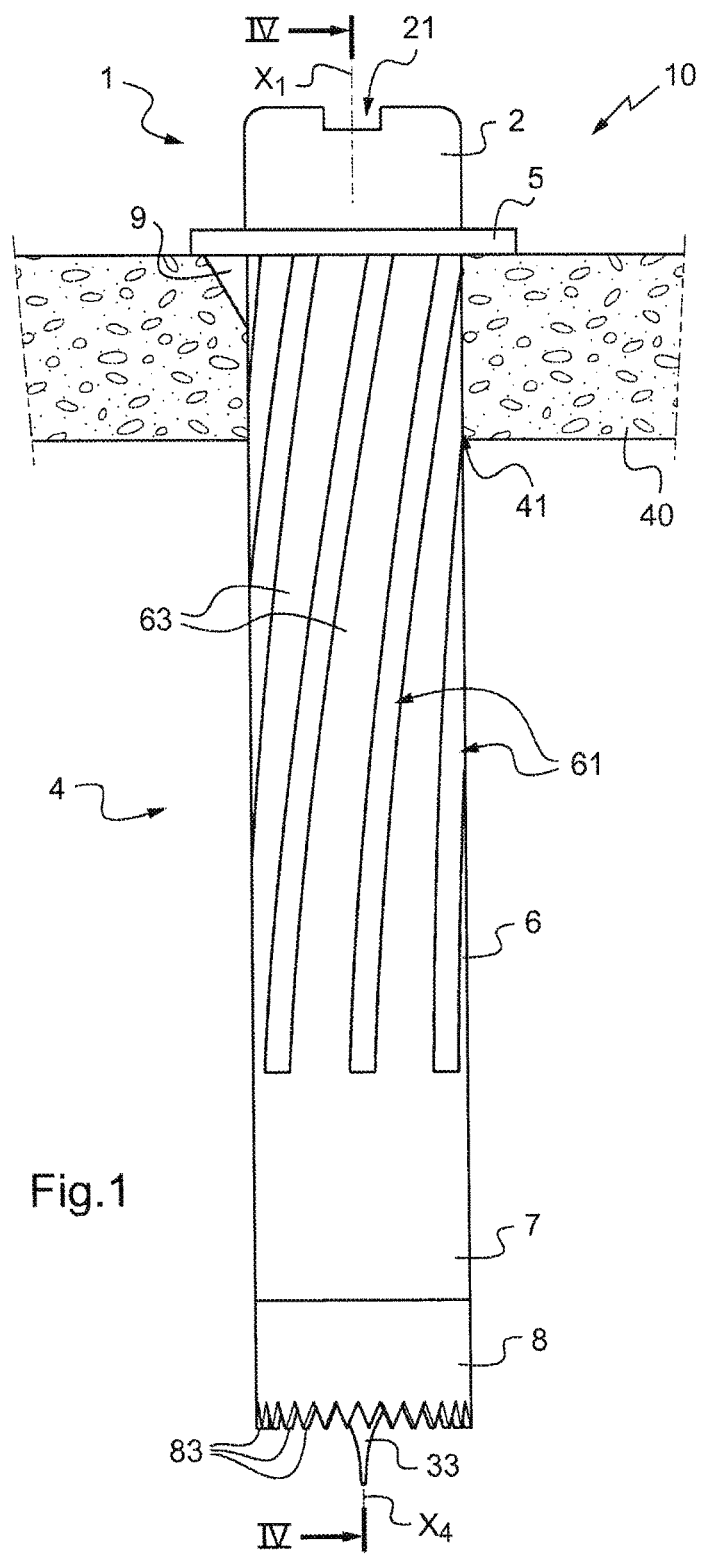
FIG. 1 is a side view of an anchor in accordance with a first embodiment of the invention, the anchor being inserted but not yet immobilized in a wall.
Figure 4:
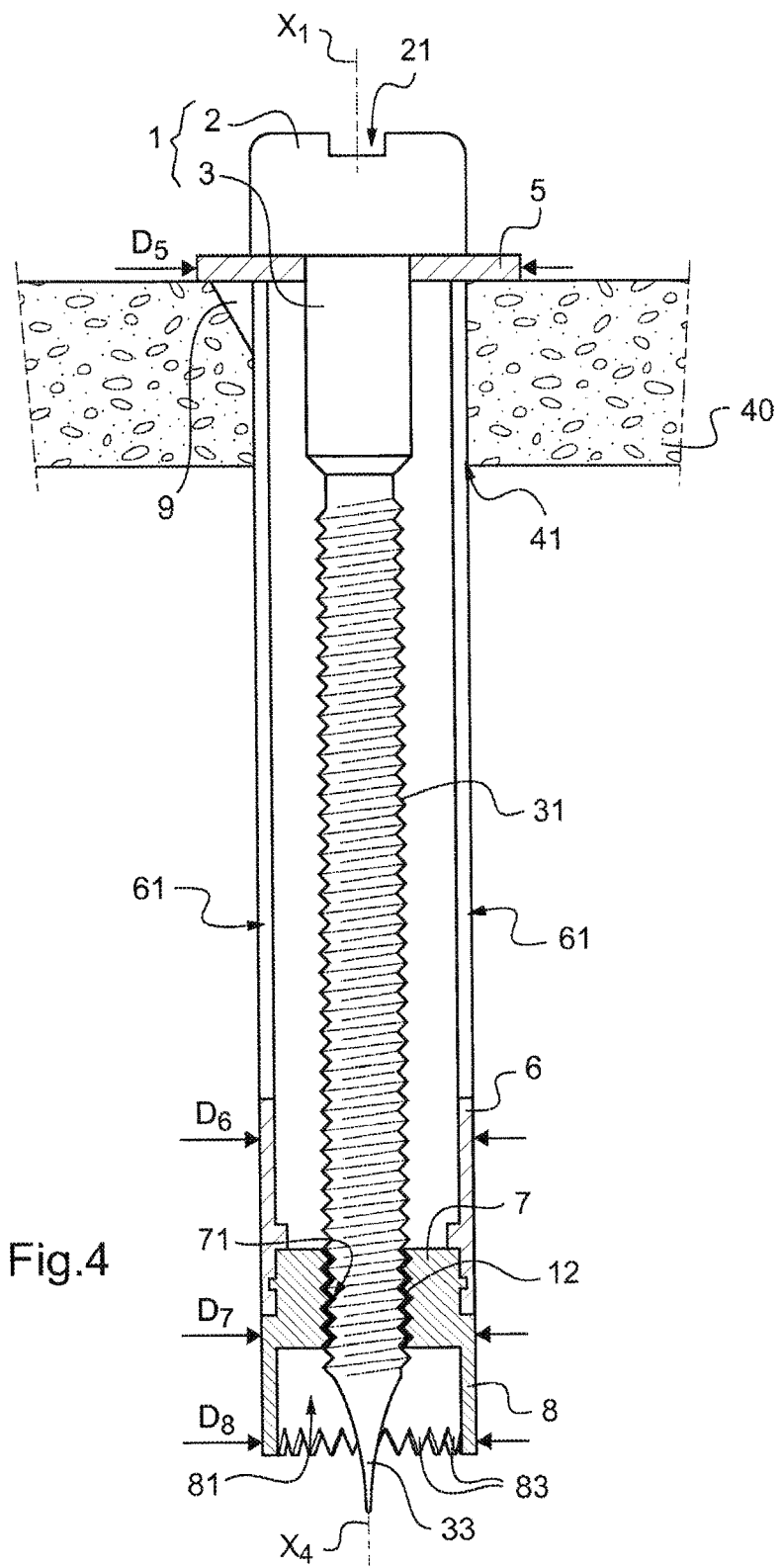
FIG. 4 is a cross section on the line IV-IV in FIG. 1.

The anchor 10, seen in FIGS. 1 to 4, is a self-drilling anchor designed to fix a part, not shown in these figures, to a thin support wall 40. As a nonlimiting example, the wall 40 is a plasterboard.

The anchor 10 comprises a screw 1 and an anchor body 4. The screw 1, having a longitudinal axis $X_1$, comprises a head 2 and a shank 3 bearing a thread 31. The head 2 is provided with a recess 21 for receiving a screwing tool on its face oriented away from the shank 3. The anchor body 4 has a tubular overall shape and comprises an internal bore having a circular cross section, centered on an axis $X_4$, which is designed to receive the shank 3 of the screw. When the shank 3 is received in the bore of the anchor body 4, the axes $X_1$ and $X_4$ coincide.

At that end oriented toward the head 2 of the screw, the anchor body 4 comprises a flange 5 of external diameter $D_5$ which is designed to come to press against the wall 40. The flange 5 is connected to an expansion portion 6 of external diameter $D_6$ smaller than that of the flange. The flange 5 and the expansion portion 6 are made of the same plastic material. The side wall of the expansion portion 6 has longitudinal slits 61 which are distributed circumferentially and are inclined relative to the axis $X_4$. The slits 61 define, between them, strips 63 which can be deformed plastically. The anchor body 4 also comprises rotation locking fins 9 located at the junction of the flange 5 and the expansion portion 6.

At its other end, the anchor body 4 comprises a piercing element 8 in the form of a hole saw. The hole saw 8 comprises an internal bore 81, through which the shank 3 of the screw can pass freely, and a series of teeth 83 distributed circumferentially around the bore 81. Advantageously, the opposite end 33 of the shank 3 of the screw from the head 2 is tapered so as to form a center punch for the hole saw 8.

The hole saw 8 and the expansion portion 6 are connected to one another by a threaded portion 7, wherein the external diameters $D_7$ and $D_8$ of the threaded portion 7 and of the hole saw 8 are substantially equal to that of the expansion portion 6. The threaded portion 7 has an internal thread 71 designed to engage with the thread 31 of the screw such that it forms a nut on the shank 3 of the screw. When the shank 3 is screwed into the threaded portion 7, the latter advances in the direction of the flange 5, helically deforming the expansion portion 6 as shown in FIGS. 2 and 3. When the expansion portion 6 is in the deformed state, the anchor 10 is immobilized with respect to the wall 40.

In this first embodiment, the threaded portion 7 and the hole saw 8 are made of metal, in particular steel, in one piece. The anchor body 4 is advantageously manufactured by injection molding the plastic material of the flange 5 and the expansion portion 6 around the metal part formed by the threaded portion 7 and the hole saw 8. In accordance with the invention, the screw 1 and the anchor body 4 are fastened to one another by a layer of adhesive 12 interposed between the thread 71 of the threaded portion 7 and the thread 31 of the screw, this layer of adhesive 12 being designed to break when a predetermined torque $T_0$ is exceeded.

Installing the anchor 10 in the wall 40 is done by driving the screw 1 in rotation in the conventional screwing direction, by using a tool in the recess 21 provided for this purpose in the head 2 of the screw. In a first step, the torque applied between the screw 1 and the anchor body 4 is less than the predetermined torque $T_0$, such that the screw and the anchor body are connected to each other in terms of movement by the layer of adhesive 12. Rotating the screw 1 causes the hole saw 8 to rotate and, by putting the hole saw 8 in contact with the wall 40, a hole 41 is made in the wall, with the anchor body 4 being inserted therein at the same time. When the flange 5 comes to press against the wall 40, the rotation locking fins 9 are in engagement with the material of the wall 40, such that the anchor body 4 is prevented from rotating relative to the wall. The screw 1 and the anchor body 4 remain fastened to one another until a torque equal to or greater than the predetermined torque $T_0$ is reached. By continuing to drive the screw 1 in rotation, and thus increasing the torque, the screw 1 detaches from the anchor body 4, causing the screw to be screwed into the threaded portion 7 and causing the threaded portion 7 to advance in the direction of the flange 5. This results in deformation of the expansion portion 6, which locks the anchor body 4 in the hole 41 in the wall.

Figure 5:
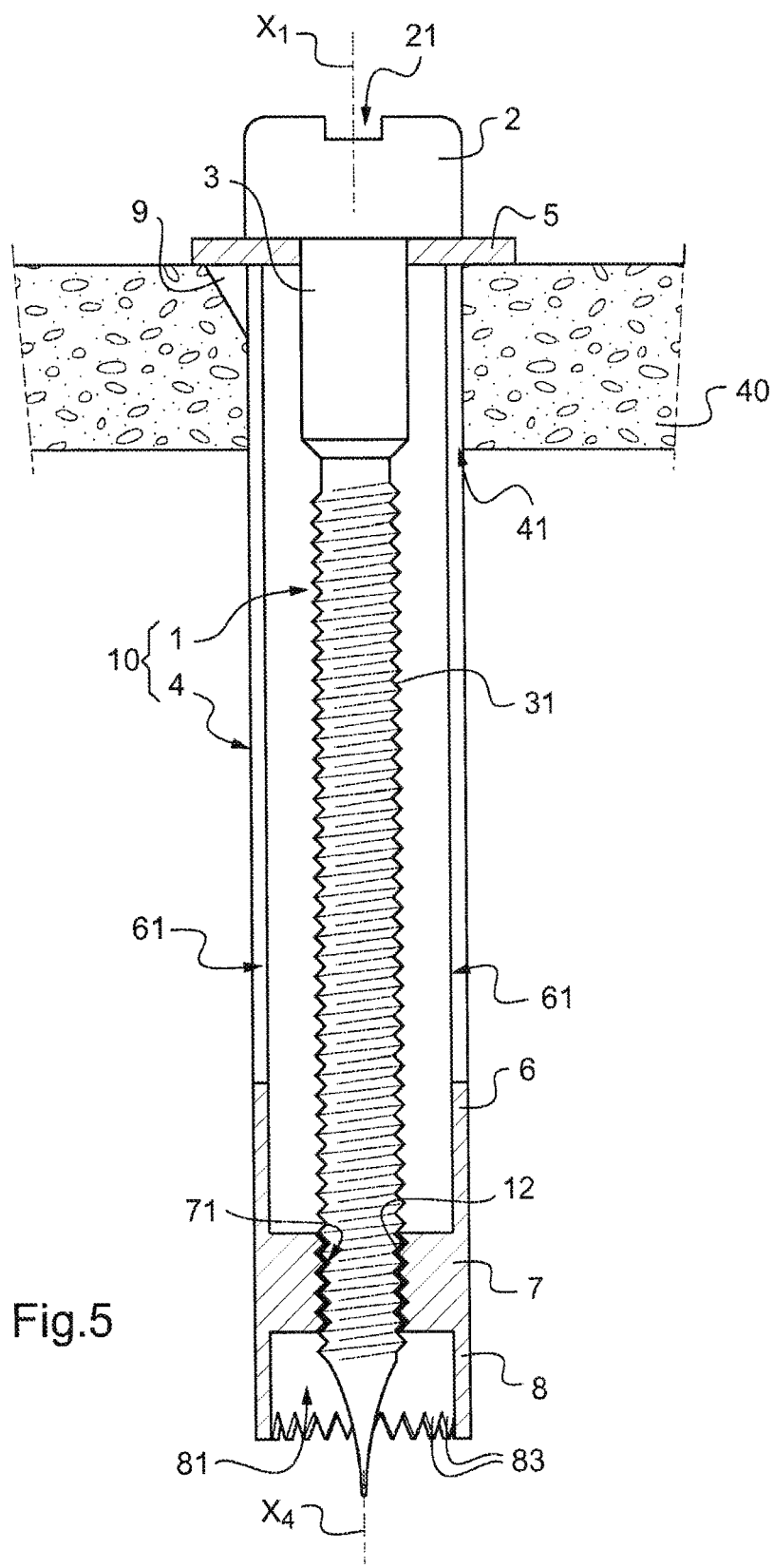
FIG. 5 is a cross section similar to FIG. 4 for an anchor according to a second embodiment of the invention.

In the second embodiment shown in FIG. 5, those elements which are analogous to those of the first embodiment bear identical reference signs. The anchor shown in FIG. 5 differs from that of the first embodiment in that all of the anchor body 4 is made of plastic, including the threaded portion 7 and the hole saw 8. The anchor body 4 is then advantageously manufactured as a single part by injection molding. The threaded portion 7 and the hole saw 8 are preferably made of the same plastic material, which is more rigid than the plastic material from which the flange 5 and the expansion portion 6 are made.

Figure 6:
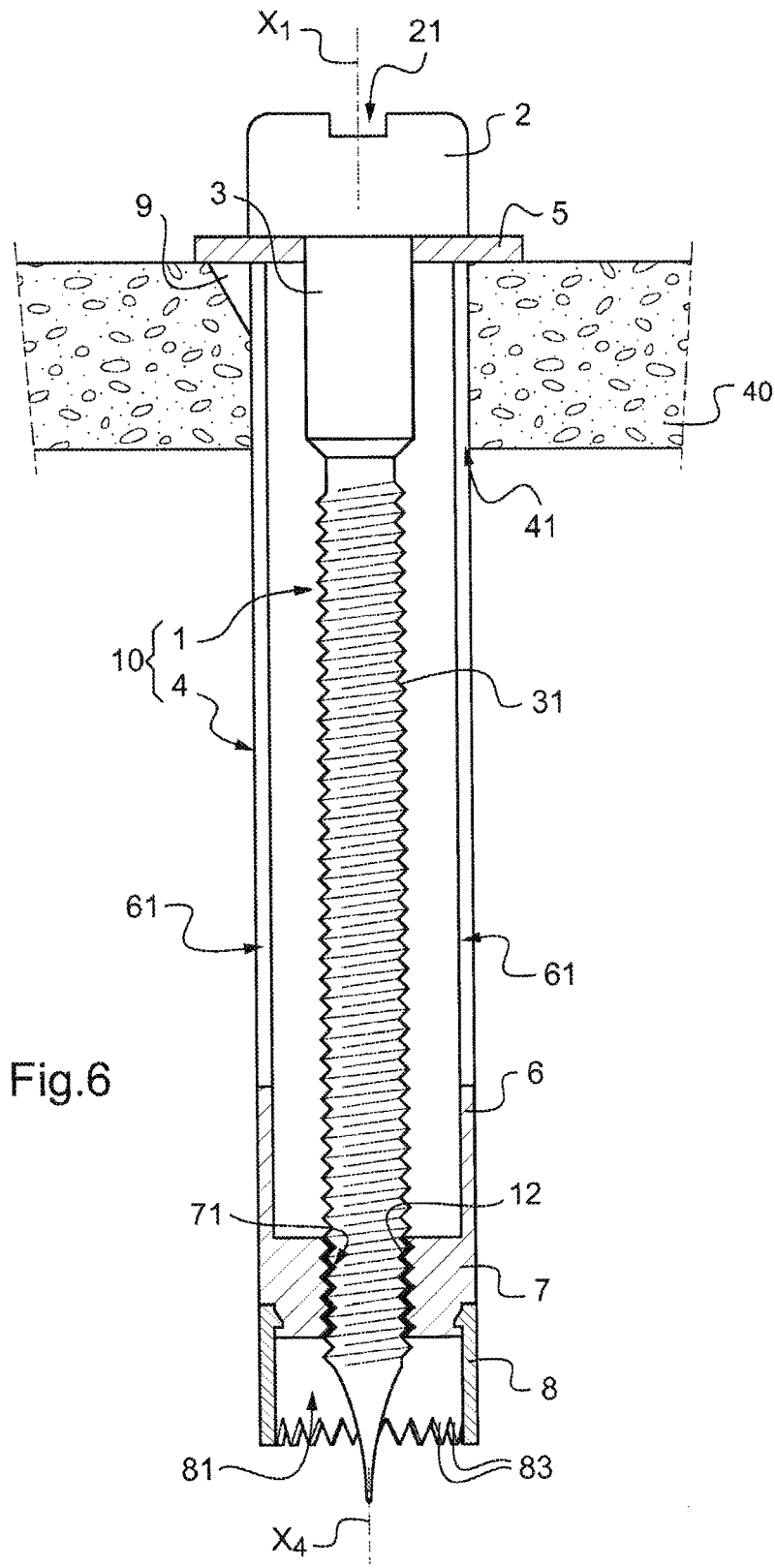
FIG. 6 is a cross section similar to FIG. 4 for an anchor according to a third embodiment of the invention.
Figure 7:
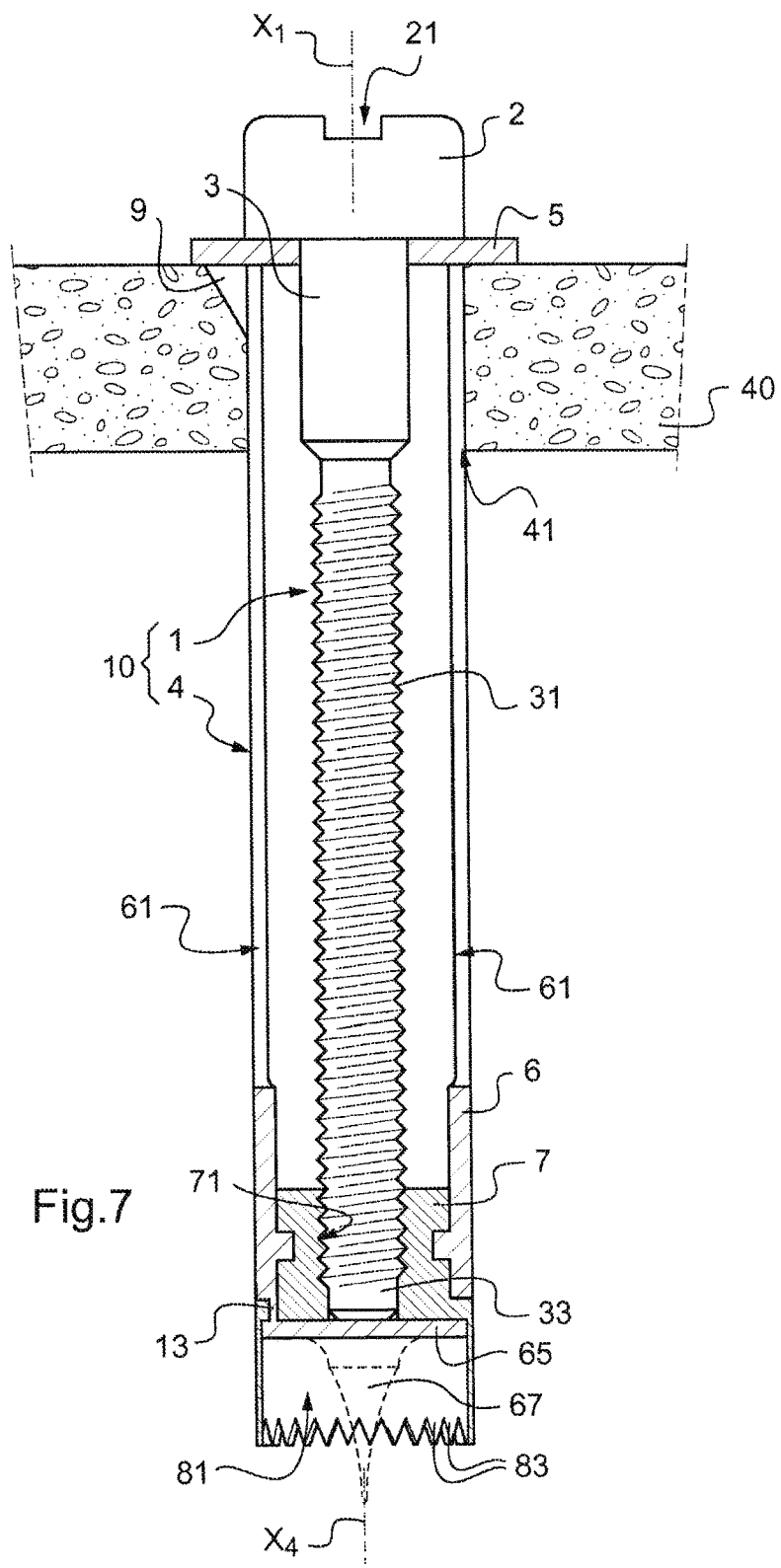
FIG. 7 is a cross section similar to FIG. 4 for an anchor according to a fourth embodiment of the invention.
Figure 8:
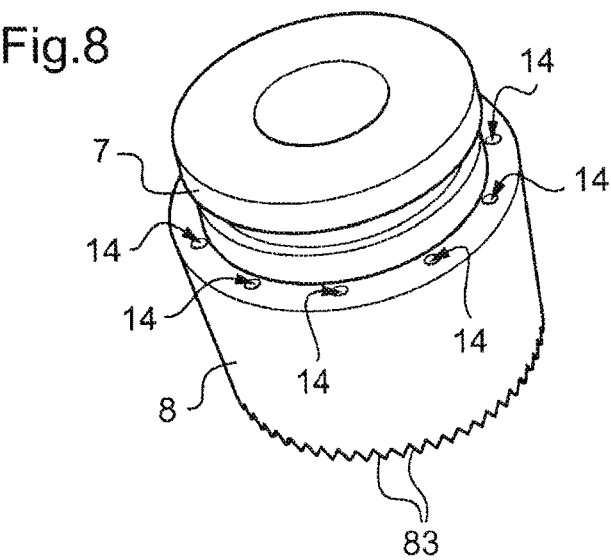
FIG. 8 is a perspective view of the metal part which forms the threaded portion and the piercing element of the anchor body of the anchor of FIG. 7.
Figure 9:
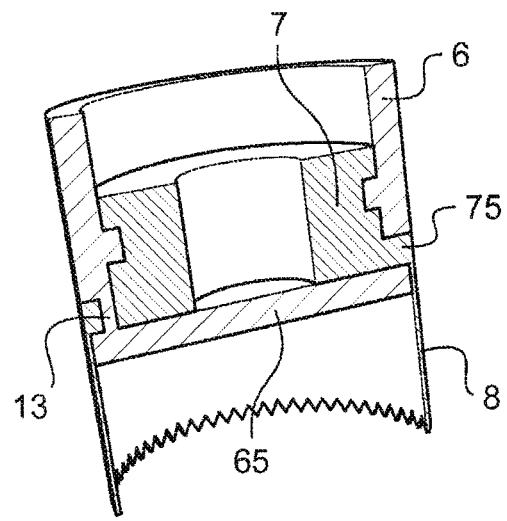
FIG. 9 is a perspective view with a partial section of the end of the anchor body of the anchor of FIG. 7 at the other end from the head of the screw.
Figure 10:
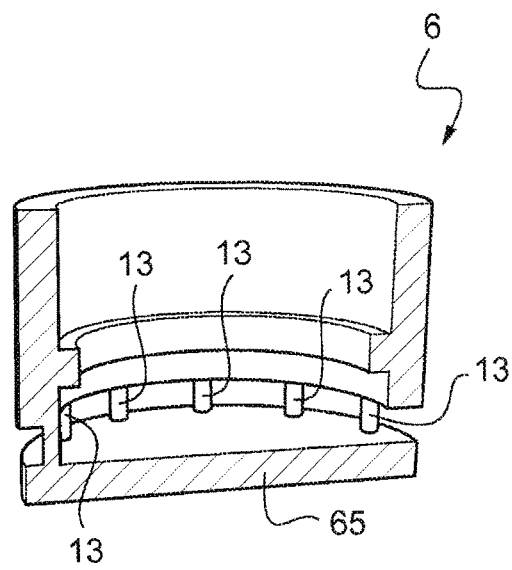
FIG. 10 is a perspective view with a partial section of the end of the expansion portion of the anchor body of the anchor of FIG. 7 at the other end from the head of the screw.
Figure 11:
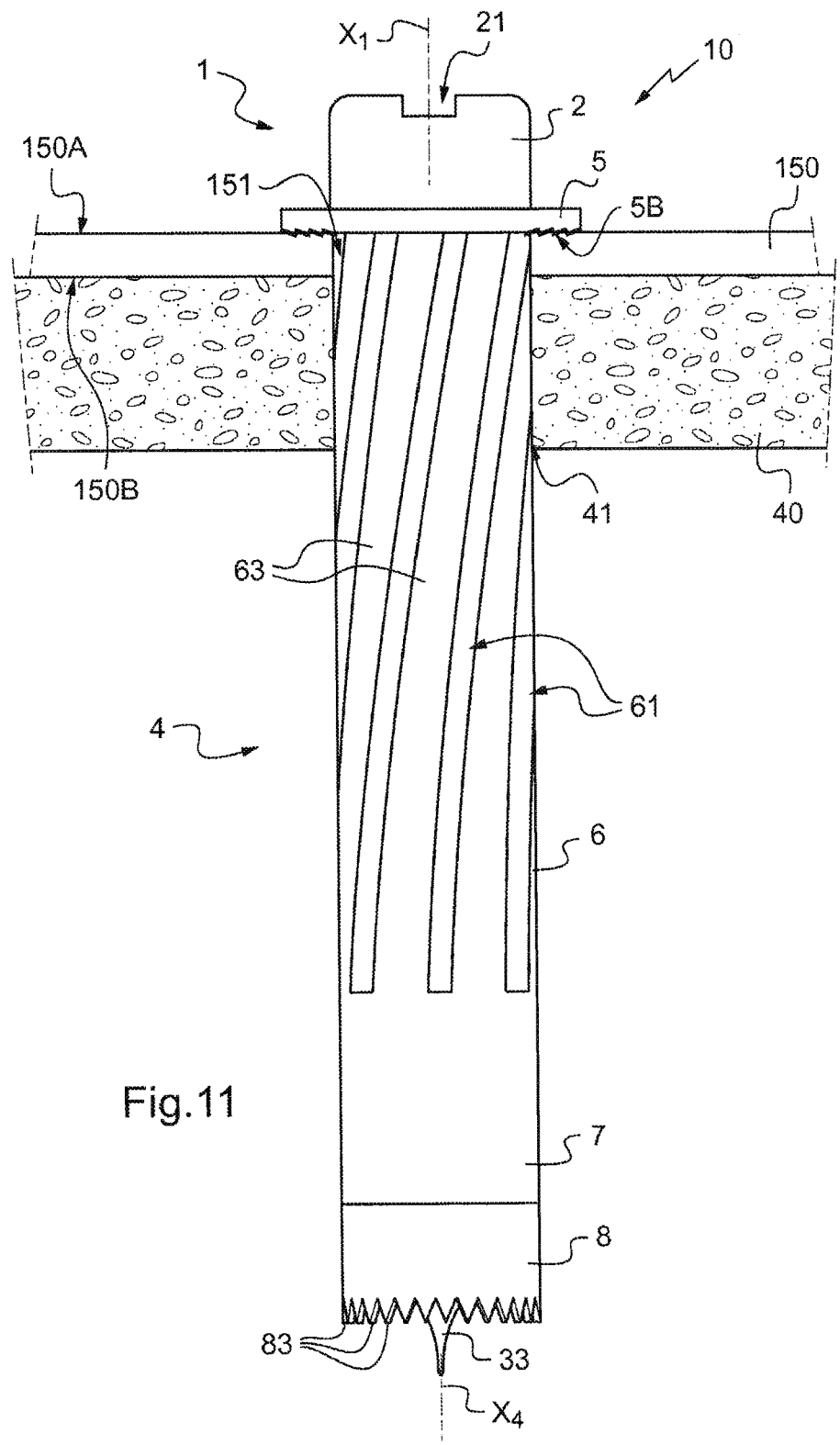
FIG. 11 is a view similar to FIG. 1 for an anchor in accordance with a fifth embodiment of the invention, the anchor being inserted but not yet immobilized in a wall.

In the third embodiment shown in FIG. 6, those elements which are analogous to those of the first embodiment bear identical reference signs. The anchor shown in FIG. 6 differs from that of the first embodiment in that the threaded portion 7 is made of plastic whereas the hole saw 8 is still made of metal. The threaded portion 7 is preferably made of a plastic material which is more rigid than the plastic material from which the flange 5 and the expansion portion 6 are made. As in the first embodiment, the anchor body 4 is advantageously manufactured by injection molding the plastic materials of the flange 5, the expansion portion 6 and the threaded portion 7 around the metal part formed by the hole saw 8.

In the fourth embodiment shown in FIGS. 7 to 10, those elements which are analogous to those of the first embodiment bear identical reference signs. The anchor 10 shown in FIG. 7 differs from that of the first embodiment in that the detachable fastening means between the screw 1 and the anchor body 4 are no longer formed by a layer of adhesive 12, but by frangible tabs 13. As shown in FIGS. 7 to 10, the threaded portion 7 and the hole saw 8 are formed by a single metal part, while the flange 5 and the expansion portion 6 are obtained by injection molding a plastic material around this metal part. During injection molding, the plastic material from which the flange 5 and the expansion portion 6 are made passes into holes 14 in the metal part. This forms the frangible tabs 13 as well as a platform 65 positioned pressing against a shoulder 75 of the metal part located at the junction of the threaded portion 7 and the piercing element 8. The platform 65 receives, in abutment, the opposite end 33 of the shank 3 of the screw from the head 2, such that the screw 1 and the anchor body 4 are fastened to one another. The frangible tabs 13 are designed to break when the predetermined torque $T_0$ is exceeded, so as to detach the platform 65 from the rest of the expansion portion 6 and to make it possible to screw the screw 1 into the thread 71 of the threaded portion 7 and thus to deform the expansion portion 6. In this embodiment, as the end 33 of the screw is in abutment against the platform 65, it cannot be used as a centering element when the wall 40 is pierced using the hole saw 8. A center punch 67 made of plastic, produced in one piece with the platform 65 and projecting therefrom away from the end 33 of the screw, can then be formed during the injection molding.

In the fifth embodiment shown in FIGS. 11 to 15, those elements which are analogous to those of the first embodiment bear identical reference signs. The anchor 10 shown in FIG. 11 differs from that of the first embodiment in that the rotation locking means for preventing the anchor body 4 from rotating relative to the wall 40 are not fins 9 for anchoring in the material of the wall, but raised patterns 52 provided on that face 5B of the flange 5 which is oriented away from the head 2 of the screw and which are designed to engage with complementary raised patterns 152 provided on a part 150 to be fixed to the wall. In the example shown in FIGS. 11 to 15, the part to be fixed to the wall 40 is a bracket 150, one leg 154 of which is intended to come to press against the wall. The leg 154 of the bracket 150 comprises two openings 151, the rotation locking patterns 152 being provided around each opening 151 on a face 150A of the leg 154 intended to be oriented toward the face 5B of the flange 5. The leg 154 advantageously comprises, on its face 150B which presses against the wall 40, studs 153 for provisionally immobilizing the bracket with respect to the wall 40. The openings 151 can then be used as centering elements when piercing the wall 40 using the hole saw 8. In this case, it is not necessary for the end 33 of the screw to form a center punch.

The invention is not restricted to the examples described and shown. In particular, a frangible connection, in particular by means of frangible tabs 13 as above, can be implemented in the case of an all-plastic plastic anchor body 4, or when only the piercing element 8 is made of metal. Moreover, the detachable fastening between the screw 1 and the anchor body 4 can be obtained by a prestress connection between the thread of the screw and the thread of the threaded portion, instead of by means of a layer of adhesive or frangible tabs as described in the preceding examples. The piercing element can also be of any form other than a hole saw, provided it comprises an internal bore through which the shank of the screw can pass freely. Finally, the expansion portion may differ from that described and shown, in particular it may comprise deformation modes other than a helical deformation; it may in particular be an expansion body comprising a plurality of elongate metal legs which are designed to bend and fold flat against the rear face of the wall, spread out in a star shape.

The invention claimed is:

1. A self-drilling anchor for fixing in a wall, comprising:
a screw including a head and a shank bearing a thread;
an anchor body configured to receive the shank of the screw;
wherein the anchor body comprises:
a flange at that end of the anchor body oriented toward the head of the screw,
a threaded portion configured to engage with the thread of the screw,
a deformable expansion portion between the flange and the threaded portion,
a rotation locking mechanism for preventing rotation of the anchor body relative to the wall;
the threaded portion configured to advance in a direction of the flange, by deforming the expansion portion, when the screw is screwed into the threaded portion;
the anchor body further comprising a piercing element at its opposite end from the flange;
the anchor further comprising a fastening mechanism between the screw and the anchor body, wherein the fastening mechanism is detachable by a torque, applied between the screw and the anchor body, equal to or greater than a predetermined torque,
wherein the detachable fastening mechanism ensures a fastening between the shank of the screw and the anchor body so that, as long as the torque applied between the screw and the anchor body is less than the predetermined torque, the screw and the anchor body are connected to each other in terms of movement by the fastening mechanism, and
wherein the fastening mechanism is positioned between the deformable expansion portion and the piercing element.

2. The anchor as claimed in claim 1, wherein the detachable fastening mechanism is active between the screw and the anchor body independently of a contact force between the head of the screw and the flange of the anchor body.

3. The anchor as claimed in claim 1, wherein the piercing element comprises an internal bore configured for the shank of the screw to pass through.

4. The anchor as claimed in claim 3, wherein the piercing element comprises, at its opposite end from the flange, a plurality of teeth distributed circumferentially around the bore, or the piercing element is a hole saw.

5. The anchor as claimed in claim 1, wherein the opposite end of the shank of the screw from the head forms a center punch for the piercing element.

6. The anchor as claimed in claim 1, wherein radial dimensions of the piercing element are equal to or greater than radial dimensions of the threaded portion and of the expansion portion in the non-deformed state, and are strictly smaller than the radial dimensions of the flange.

7. The anchor as claimed in claim 1, wherein the expansion portion is made of plastic.

8. The anchor as claimed in claim 1, wherein the piercing element is made of metal.

9. The anchor as claimed in claim 8, wherein the anchor body is obtained by injection molding a plastic material around the or each metal part formed by the threaded portion and/or the piercing element.

10. A method for manufacturing an anchor as claimed in claim 8, wherein the or each metal part formed by the threaded portion and/or the piercing element is placed in a mold and a plastic material is injected into the mold around the or each metal part.

11. The anchor as claimed in claim 1, wherein the threaded portion is made of metal.

12. The anchor as claimed in claim 1, wherein the threaded portion and the piercing element are a single metal part.

13. The anchor as claimed in claim 1, wherein the expansion portion, the threaded portion, and the piercing element are made of plastic.

14. The anchor as claimed in claim 13, wherein the threaded portion and the piercing element are made of a plastic material which is more rigid than the plastic material of the expansion portion.

15. The anchor as claimed in claim 13, wherein the anchor body is obtained by injection molding in a single part.

16. A method for manufacturing an anchor as claimed in claim 13, by injecting a plastic material or plural compatible plastic materials in a mold.

17. The anchor as claimed in claim 1, wherein the detachable fastening mechanism comprises a layer of adhesive between the screw and the anchor body which is designed to break when the predetermined torque is exceeded.

18. The anchor as claimed in claim 1, wherein the detachable fastening mechanism comprises a frangible connection between the screw and the anchor body which is designed to break when the predetermined torque is exceeded.

19. The anchor as claimed in claim 1, wherein the detachable fastening mechanism comprises a prestress connection between the screw and the anchor body which is designed to break when the predetermined torque is exceeded.

20. The anchor as claimed in claim 1, wherein the rotation locking mechanism for preventing rotation of the anchor body relative to the wall comprises at least one fin for anchoring in the wall near the flange.

21. The anchor as claimed in claim 1, wherein the expansion portion comprises a plurality of longitudinal slits that are distributed circumferentially and are inclined relative to a longitudinal axis of the expansion portion, which define a plurality of strips that are helically deformable when the screw is screwed into the threaded portion.

22. The use of an anchor as claimed in claim 1 for fixing in a thin wall, or a construction panel, a plasterboard, a cement board, a chipboard, a wooden panel, a hollow clay block, a composite panel formed by assembling a plasterboard panel, an insulating panel made of expanded polystyrene or polyurethane foam.

23. The use of an anchor as claimed in claim 1 for fixing in a solid material, or cellular concrete.

* * * * *